UNITED STATES PATENT OFFICE.

AARON H. FREAR, OF CHICAGO, ILLINOIS.

IMPROVEMENT IN THE MANUFACTURE OF ARTIFICIAL STONE.

Specification forming part of Letters Patent No. 101,253, dated March 29, 1870.

*To all whom it may concern:*

Be it known that I, AARON H. FREAR, of Chicago, in the county of Cook and State of Illinois, have invented a new and useful Artificial Stone; and I do hereby declare the following to be a full, clear, and exact description thereof, which will enable others skilled in the art to which my invention appertains to make and use the same.

My invention consists in the use of an aqueous saccharine solution of litharge for cementing together particles of silex, alumina, calcium, or other mineral substances, in combination with metallic oxides or other substances to produce artificially a hard and durable stone or marble, stucco, or cement, for building and ornamental purposes.

In the manufacture of artificial stone for building purposes I employ a saccharine solution formed by dissolving sugar or molasses in water, in the proportion of about six or eight ounces of sugar or its equivalent of molasses in about one gallon of water, and then to this quantity I add about one pound of litharge, and mix thoroughly.

A firm and durable stone is produced by moistening about ten quarts of cement, twenty-five quarts of sand or gravel, one quart of gypsum or plaster of Paris, and about three quarts of oxide of iron with the aqueous saccharine solution of litharge, and then firmly pressing the composition into molds of any desired form, either by machinery or hand, with mallets or tamping-rods.

For the purpose of imitating marble I use the oxide of zinc in place of the oxide of iron.

The blocks or other articles thus produced will rapidly harden when removed from the molds, and are ready for use in a very few days.

I prefer to compress the materials by percussion rather than by simple or lever pressure.

To produce a more perfect finish I contemplate washing the surface or face of the artificial stone thus manufactured, two or three days after molding the same, with a weak solution of my saccharine solution of litharge, or of shellac dissolved in alcohol in the proportion of about one pound of shellac to one gallon of alcohol.

To produce a mastic or stucco I add so much of my saccharine solution of litharge to lime, sand, clay, or any earthy or silicious material, or to mixtures or combinations thereof, as will be reduced by the solution to a pasty consistency, so that it can be worked and applied with a trowel. This compound when applied in a plastic condition to any suitable surface will firmly adhere thereto, and upon hardening become perfectly water-proof. It may be made to resemble stone so closely as not to be distinguished therefrom.

By making the composition still thinner it may be used as a substitute for paint with good effect, and will also form a strong adhesive cement for stone and brick-work.

In applying the stucco or mastic as above prepared to buildings, whether of brick or stone, I first wash the surface of the latter with the saccharine solution preparatory to laying on the composition.

By a proper choice of the sand or other material forming the basis of my improved artificial stone, &c., or by the use of pigments in connection therewith, nearly every description of natural stone may be imitated, and any variety of colors or shades obtained at pleasure.

Having thus described my invention, what I claim as new, and desire to secure by Letters Patent, is—

1. The employment of an aqueous saccharine solution of litharge in the manufacture of artificial stone, cement, stucco, paint, &c., for the purpose specified.

2. The processes herein described of forming artificial stone, cement, stucco, paint, &c., by the application, to a suitable base or body, of an aqueous saccharine solution of litharge.

3. An aqueous saccharine solution of litharge as a new article of manufacture.

AARON H. FREAR.

Witnesses:
G. H. FROST,
D. J. PONNS.